United States Patent [19]

Vignaud

[11] Patent Number: 4,781,999

[45] Date of Patent: Nov. 1, 1988

[54] METHOD OF STABILIZING ELECTROCHEMICAL PRIMARY CELLS HAVING REACTIVE ANODES OF ZINC, ALUMINUM, OR MAGNESIUM; A STABILIZED ANODE OBTAINED BY SAID METHOD; AND A CELL INCLUDING SUCH AN ANODE

[75] Inventor: René Vignaud, Aulnay sous Bois, France

[73] Assignee: Societe les Piles Wonder, Saint Ouen, France

[21] Appl. No.: 872,535

[22] Filed: Jun. 10, 1986

[30] Foreign Application Priority Data

Jun. 18, 1985 [FR] France ............................... 85 09230

[51] Int. Cl.$^4$ ............................................. H01M 4/60
[52] U.S. Cl. .................................... 429/214; 429/212; 429/209; 429/229
[58] Field of Search ............... 429/212, 213, 214, 215, 429/229, 209

[56] References Cited

U.S. PATENT DOCUMENTS

| | | | |
|---|---|---|---|
| 3,653,965 | 4/1972 | Lee ........................................ | 429/206 |
| 3,847,669 | 11/1974 | Paterniti .............................. | 429/215 |
| 3,928,074 | 12/1975 | Jung et al. .......................... | 429/212 |
| 4,435,488 | 3/1984 | Bahary et al. ...................... | 429/212 |

OTHER PUBLICATIONS

Corrosion-Nace, vol. 34, No. 3, Mar. 1978, pp. 98-109, National Association of Corrosion Engineers; R. L. Lelroy: "Chelate Inhibitors for Zinc and Galvanized Products".

Morrison et al. "Organic Chemistry" 3rd ed. Allyn and Bacon, Inc., Boston, Mass., 1973, p. 1173.

Primary Examiner—John F. Niebling
Assistant Examiner—Steven P. Marquis
Attorney, Agent, or Firm—Kenyon & Kenyon

[57] ABSTRACT

The invention provides a method of stabilizing a primary electrochemical cell which includes at least one reactive anode made of a metal selected from the group constituted by zinc, aluminum, and magnesium, the method consisting in adding a stabilizer to said electrode, the stabilizer concentration lying in the range 0.001% to 1% by weight of electrode metal, and the stabilizer comprising at least one alkyl and polyethoxylalcohol sulfide satisfying the following formula:

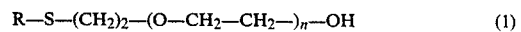

$$R-S-(CH_2)_2-(O-CH_2-CH_2-)_n-OH \qquad (1)$$

in which:

R is an alkyl radical which may optionally be branched, an aryl radical, or an alkylaryl radical; and n lies in the range 2 to 100.

The invention also provides an anode obtained by the above method, and a primary electrochemical cell having an alkaline or a saline electrolyte and including such an anode.

13 Claims, No Drawings

METHOD OF STABILIZING ELECTROCHEMICAL PRIMARY CELLS HAVING REACTIVE ANODES OF ZINC, ALUMINUM, OR MAGNESIUM; A STABILIZED ANODE OBTAINED BY SAID METHOD; AND A CELL INCLUDING SUCH AN ANODE

The invention relates to primary electrochemical cells, often known as "batteries", including highly reactive anodes made of zinc, aluminum, or magnesium, and in particular to cells of the following types: magnesium dioxide/zinc; silver oxide/zinc; mercury oxide/zinc; air/zinc; silver chloride/ magnesium; and air-/aluminum. Such cells have an alkaline or saline electrolyte such as an aqueous solution of ammonium chloride and of zinc chloride or potash, with the anode being corrosible in said solution.

BACKGROUND OF THE INVENTION

Although such cells can be used to obtain high energies, they suffer from relatively poor stability by virtue of their reactive anodes being corrosible in the alkaline or saline electrolyte, and in particular they suffer from:

loss of cell capacity during storage by virtue of the anode dissolving partially in the electrolyte; and considerable quantities of gaseous hydrogen being continuously evolved, causing electrolyte to be ejected and causing the cell to swell, and sometimes even to burst.

These unwanted phenomena occur with increased vigor with rising temperature, for example when cells are stored in a hot country.

In order to mitigate these drawbacks and to stabilize a cell of the above type, in particular a cell having an alkaline electrolyte, proposals have been made to stabilize such cells either by incorporating mercury in a zinc anode (thereby forming an amalgam) or else by adding various organic compounds. Proposals were initially made to incorporate a certain percentage of mercury, e.g. 5% to 15% by weight relative to the active metal when the active metal is zinc, and this is applicable in particular for cells having an alkaline electrolyte.

Mercury has the property of increasing the hydrogen overvoltage of the metal in which it is incorporated (in particular when its concentration is high) by inhibiting the proton reduction reaction.

Unfortunately, mercury and more particularly mercury compounds are toxic. This requires strict safety precautions to be taken during the industrial manufacturing process, and it also means that waste cells discarded after use constitute a source of dangerous pollution.

It is thus advantageous to avoid using mercury or to use as little mercury as possible for ecological reasons. In addition, regulations are reducing the allowable amounts of mercury to lower and lower levels.

However, if the amount of mercury drops to less than about 3% by weight relative to the amount of zinc in the anode, adequate stability is not obtained in the resulting alkaline electrolyte battery.

Proposals have also been made to add various organic compounds to a cell having a zinc, aluminum, or magnesium anode in order to improve stability. Such compounds include oleic diethanolamide, monolaurylether, and various polymers of ethylene oxide, and they replace mercury either completely or partially.

Unfortunately, such compounds do not provide adequate stability on their own, and they are often difficult to use or of low efficiency.

For ethylene oxide polymers, particular mention may be made of U.S. Pat. No. 3,847,669 in the name of Union Carbide, which proposes adding an ethylene oxide polymer to a zinc anode containing less than 8% mercury, with the polymer being selected from the group constituted by di-, tri-, and poly-ethylene glycols having an average molecular weight in the range 190 to 7,000 alkyl ethers thereof, and alkanoate esters thereof, in order to improve the stability of cells having such anodes. Said Union Carbide patent describes using alkyl and alkanoate radicals having 1 to 4 atoms of carbon.

In French patent application number 84 10632 filed July 4th, 1984 and entitled "A method of stabilizing electrochemical primary cells having reactive anodes made of zinc, aluminum, or magnesium, and anodes for such cells stabilized by said method", the present Assignee has also described a method of stabilizing primary electrochemical cells including at least one reactive anode made of metal taken from the group consisting of zinc, aluminum, and magnesium, and characterized by adding at least one perfluorinated organic compound of the ethoxyl fluoroalcohol type to said electrode in a concentration lying in the range 0.01% to 1% by weight relative to the weight of the metal.

SUMMARY OF THE INVENTION

In contrast to the above teaching, the present Applicant has now discovered that it is possible to stabilize a reactive anode made of zinc, aluminum or magnesium in a primary electrochemical cell having an alkaline or saline electrolyte by incorporating in said anode a very small quantity (generally less than 1% by weight relative to the weight of metal in the anode) of at least one alkyl and polyethoxyl alcohol sulfide having the formula:

$$R-S-(CH_2)_2-(O-CH_2-CH_2-)_n-OH \qquad (1)$$

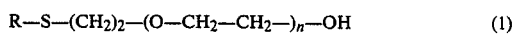

in which:

R is an alkyl radical which may optionally be ramified, an aryl radical, or an alkylaryl radical; and n lies in the range 2 to 100.

The present invention thus provides:

(a) a method of stabilizing a primary electrochemical cell which includes at least one reactive anode made of a metal selected from the group constituted by zinc, aluminum, and magnesium, the method consisting in adding a stabilizer to said electrode, the stabilizer concentration lying in the range 0.001% to 1% by weight of electrode metal, and the stabilizer comprising at least one alkyl and polyethoxylalcohol sulfide satisfying the following formula:

$$R-S-(CH_2)_2-(O-CH_2-CH_2-)_n-OH \qquad (1)$$

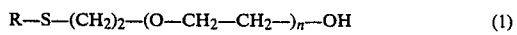

in which:

R is an alkyl radical which may optionally be ramified, an aryl radical, or an alkylaryl radical; and n lies in the range 2 to 100.

The invention also provides:

(b) a stabilized electrode obtained by said method; and (c) a primary electrochemical cell (an "electric battery") including such an anode.

Preferably:

R is an alkyl radical having about 12 carbon atoms; and/or n lies in the range 2 to about 20.

In preferred implementations, the radical R is branched and it is constituted, in particular, by a tertiary radical.

A single compound corresponding to formula (1) above may be used, or else a mixture of two or more such compounds may be used.

If the anode is made of zinc, it is still preferable to add some mercury thereto, but only in relatively small quantities, e.g. less than 2% by weight of zinc, in particular when the zinc anode is intended for use in a cell having an alkaline electrolyte.

The invention serves to reduce corrosion of the anode metal and to avoid loss of cell capacity during storage; it also avoids hydrogen being evolved and the corresponding electrolyte leakage or cell swelling, without it being necessary to add mercury, or, at least if the electrode is made of zinc, only a reduced quantity of mercury satisfying current standards and ecological requirements need be added.

The invention will be better understood from the following description of specific examples which, naturally, are given purely be way of example and should not be taken to limit the scope of the invention.

CASE A

A zinc electrode for an "alkaline" cell, i.e. having an alkaline electrolyte.

An anode mixture is prepared for constituting the negative electrode (i.e. the anode) of a primary cell by successively inserting the following into a mixer: zinc powder including 1% mercury; a 40% potash solution; a gelling agent such as carboxymethylcellulose; and inhibiter in accordance with the invention. The concentrations are as follows: 500 ml potassium solution and 50 g carboxymethylcellulose per kilogram of amalgamated zinc.

The inhibitor may be spread over the surface of the amalgamated zinc by using a non-aqueous solvent (such as ethyl alcohol or acetone) which then evaporates, or by mixing the inhibitor with the potash solution.

The anode mass thus obtained is tested in a 10 N potash solution at 45°, and the speed of corrosion is measured in $\mu l/g/day$ (microliters of NTP hydrogen per gram of zinc and per day). A speed greater than 10 $\mu l/g/day$ is unacceptable in an electrochemical cell.

The speed of corrosion (determined in terms of the volume of hydrogen evolved per gram of sample and per day when the sample is immersed in the electrolyte in question) is commonly used for monitoring samples of amalgam and is highly correlated with the effective conservation of electrochemical cells during storage. It is common practice to operate the test at 45° C. in order to accelerate it.

By way of comparison, a non-amalgamated zinc powder has a speed of corrosion which is considerably greater than 10 $\mu l/g/day$ (and is about 2,000 $\mu l/g/day$), a zinc amalgam powder having 0.2% mercury has a corrosion speed of about 200 $\mu l/g/day$, having 1% mercury has a speed of corrosion of about 20 $\mu l/g/day$ (i.e. still greater than 10 $\mu l/g/day$), and having 5% mercury has a speed of corrosion of about 1.5 $\mu l/g/day$, which speed is acceptable for most cells.

EXAMPLES 1 TO 4

The inhibitor is constituted by a compound in accordance with formula (1) in which R is a tertiododecyl radical with different values for n:

example 1, has n=2
example 2, has n=7
example 3, has n=11 and
example 4, has n=20.

In each case the inhibiter concentration is 0.1% by weight of zinc.

The following corrosion speeds in $\mu l/g/day$ were observed:

in example 1, the speed was 1.93
in example 2, the speed was 1.57
in example 3, the speed was 1.24 and
in example 4, the speed was 1.07.

When mercury was used as well, i.e. using a zinc powder with 0.2% mercury by weight and 0.1% inhibiter in accordance with examples 2 to 4, the corrosion speed expressed in $\mu l/g/day$ was found to be:

in example 2, 4.6 $\mu l/g/day$
in example 3, 2.8 $\mu l/g/day$
in example 4, 1.9 $\mu l/g/day$.

An example of industrial application of the invention to an alkaline cell having a zinc electrode Two sets of primary cells as described in the present Assignee's French published patent specification No. 2 503 935 were constructed:

the first set had an anode mass made of zinc powder with 5% mercury, an electrolyte constituted by a 40% potash solution, and a gelling agent (carboxymethylcellulose), with 300 ml of potash solution and 25 g of carboxymethylcellulose per kilogram of zinc amalgam;

the other set used the same electrolyte and same gelling agent in conjunction with an anode mass of zinc powder containing only 1% mercury, but in which 0.1% by weight relative to the zinc of the compound (1) of examples 1 to 4 was added during mixture of the electrolyte and the gelling agent.

Both sets of cells were stored for three months at 45° C. At the end of this storage period no seepage of electrolyte from the cells could be observed due to possible internal pressure rises. The cells were disassembled, and it was observed that the anode gell had not expanded. Finally, R20 cells taken from both sets were discharged through a 0.3 ohm resistance and gave the same discharge times with the same dispersion, namely 59 hours ±1 hour. In other words the cells of the second set did not lose more capacity than was lost by the cells of the first set.

A further example of industrial application to an alkaline cell having a zinc electrode In industrial applications where the negative electrode of the cell is constituted by a gell having a relatively low concentration of zinc metal, e.g. 48% to 52% (by mass), relative to the electrolyte, and in which the concentration of mercury in the zinc is also low, e.g. less than 1%, it is observed that it is advantageous to reduce the concentration of the inhibiter in the cell anode gell to less than 0.01% relative to the zinc, i.e. to a range of 100 ppm to 10 ppm, in order to maintain electrical performance, and in particular in order to maintain voltage.

Thus, for an anode gell comprising:

52 parts zinc alloy with 100 ppm cadmium and 1% mercury; and 48 parts 0.5 N KOH solution containing 6% ZnO and 6% carboxymethylcellulose; has 50 ppm relative to the zinc alloy of dodecyl mercaptopolyethoxyl alcohol added thereto during preparation of the mixture, preferably immediately prior to amalgamation, and intimately mixed therewith.

This low concentration of inhibiter lying in the range 10 ppm to 100 ppm is also applicable to other gell compositions, in particular to compositions which are richer in zinc, whenever a high degree of protection against corrosion is not necessary.

CASE B

A zinc electrode for a "saline" battery having a saline electrolyte

It is well known that magnesium dioxide/zinc cells, known as "saline cells", use an electrolyte made up from an aqueous solution of zinc chloride and ammonium chloride in which the zinc electrode tends to corrode to form hydrogen, thereby causing electrolyte leakage by perforation of the zinc can, and also causing loss of capacity during storage.

The zinc electrode of such cells is constituted by metal in laminar form, which is thus less reactive than the finely divided powder of alkaline cells. An amalgam need only be formed on the surface of the zinc sheet, and as a result the weight of mercury in any given cell is 1,000 times smaller than the weight which would be necessary for an alkaline cell having an alkaline electrolyte.

The inhibiting effect of compounds in accordance with the invention is shown by the corrosion test performed at 45° C. in a saline solution comprising 25% by weight $Cl_2Zn$, 25% by weight $NH_4Cl$, and water.

The use of powder zinc test pieces has the advantage of obtaining a response which is quicker and statistically more uniform. Tongues cut from a cell can are highly non-uniform in structure because of metal working during can formation, and this gives rise to a wide dispersion in corrosion test results.

The ratio of the active surface areas, and consequently of the corrosion speeds between the powder and the sheet, is about 5,000.

The following corrosion speeds were obtained:

(a) control electrode having no mercury and no inhibiter in accordance with the invention: 2,000 μl/g/day;

(b) an electrode having 0.01% by weight of the compound (1) as specified above is:

example 2: 327 μl/g/day
example 3: 170 μl/g/day
example 4: 136 μl/g/day (c) an electrode with 5% by weight of mercury: 175 μl/g/day.

The inhibiting effect of alkyl and polyethoxylalcohol sulfide in accordance with formula (1) and in accordance with the invention is clearly marked, even in a saline medium.

Naturally, and as can be seen clearly from the above, the invention is not limited to the specific implementations described above in detail.

What is claimed is:

1. A method of stabilizing a primary electrochemical cell which includes at least one reactive anode made of a metal selected from the group consisting of zinc, aluminum, magnesium, and amalgams thereof, the method comprising:
adding a stabilizer to said electrode, the stabilizer concentration lying in the range from 0.001% to 1% by weight of electrode metal, and the stabilizer comprising at least one alkyl and polyethoxylalcohol sulfide satisfying the following formula:

$$R-S-(CH_2)_2-(O-CH_2-CH_2-)_n-OH \qquad (1)$$

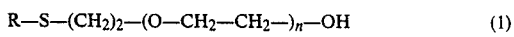

in which:
R is selected from the group consisting of an alkyl radical, an aryl radical, and an alkylaryl radical; and
n lies in the range from 2 to 100.

2. A stabilization method according to claim 1, wherein R is an alkyl radical having 12 carbon atoms.

3. A stabilization method according to claim 2, wherein R is a branched radical.

4. A stabilization method according to claim 3, wherein R is a tertiododecyl radical.

5. A method according to claim 3 wherein R is a tertiary radical.

6. A stabilization method according to claim 1, wherein n lies in the range from 2 to about 20.

7. A stabilization method according to claim 1, wherein the anode is made of a zinc amalgam that includes a quantity of mercury which is less than 2% by weight of anode metal, and the cell is an alkaline electrolyte cell.

8. A stabilization method according to claim 1, wherein the step of adding a stabilizer comprises adding a mixture of two or more compounds satisfying said formula (1).

9. A method according to claim 1 wherein R is a branched alkyl radical.

10. An anode for a primary electrochemical cell, the anode comprising a reactive metal selected from the group consisting of zinc, aluminum, magnesium, and amalgams thereof mixed with a stabilizer comprising at least one alkyl and polyethoxylalcohol sulfide satisfying the following formula:

$$R-S-(CH_2)_2-(O-CH_2-CH_2-)_n-OH, \qquad (1)$$

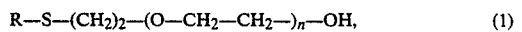

where:
R is selected from the group consisting of an alkyl radical, an aryl radical, and an alkylaryl radical, and
n lies in the range from 2 to 100, and the stabilizer concentration lies in the range from 0.001% to 1% by weight of electrode metal.

11. An alkaline electrolyte primary electrochemical cell including an anode, the anode comprising a reactive metal selected from the group consisting of zinc, aluminum, magnesium, and amalgams thereof mixed with a stabilizer comprising at least one alkyl and polyethoxylalcohol sulfide satisfying the following formula:

$$R-S-(CH_2)_2-(O-CH_2-CH_2-)_n-OH, \qquad (1)$$

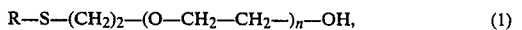

where:
R is selected from the group consisting of an alkyl radical, an aryl radical, and an alkylaryl radical, and
n lies in the range from 2 to 100, and the stabilizer concentration lies in the range from 0.001% to 1% of elecrtrode metal.

12. An electrochemical cell according to claim 11, wherein the metal of the anode is a zinc amalgam that includes a quantity of mercury which is less than 2% by weight of anode metal.

13. A saline electrolyte primary electrochemical cell, including an anode, the anode comprising a reactive metal selected from the group consisting of zinc, aluminum, magnesium, and amalgams thereof mixed with a stabilizer comprising at least one alkyl and polyethoxylalcohol sulfide satisfying the following formula:

$$R\text{---}S\text{---}(CH_2)_2\text{---}(O\text{---}CH_2\text{---}CH_2\text{---})_n\text{---}OH, \quad (1)$$

where:
- R is selected from the group consisting of an alkyl radical, an aryl radical, and an alkylaryl radical, and
- n lies in the range from 2 to 100, and the stabilizer concentration lies in the range from 0.001% to 1% by weight of electrode metal.

* * * * *